US005458447A

United States Patent [19]
Clason

[11] Patent Number: 5,458,447
[45] Date of Patent: Oct. 17, 1995

[54] CARGO RESTRAINT

[75] Inventor: Richard L. Clason, Panhandle, Tex.

[73] Assignee: R. L. Clason, Inc., Amarillo, Tex.

[21] Appl. No.: 203,420

[22] Filed: Mar. 1, 1994

[51] Int. Cl.[6] .................................... B65B 11/00
[52] U.S. Cl. .......................... 410/100; 410/97; 410/118
[58] Field of Search ........................ 410/96, 97, 99, 410/100, 103, 117, 118; 24/198, 200, 68 CD, 265 CD

[56] References Cited

U.S. PATENT DOCUMENTS

| 2,455,237 | 11/1948 | Davis | 410/97 |
| 3,085,308 | 4/1963 | White | 24/200 |
| 3,173,539 | 3/1965 | Looker | 410/97 X |
| 3,312,181 | 4/1967 | Davidson . | |
| 3,423,799 | 1/1969 | Higuchi . | |
| 3,478,394 | 11/1969 | Davis . | |
| 3,897,919 | 8/1975 | Weingarten | 410/97 |
| 3,961,585 | 6/1976 | Brewer . | |
| 4,677,711 | 7/1987 | Anscher | 24/200 |
| 5,193,955 | 3/1993 | Chou . | |

FOREIGN PATENT DOCUMENTS 2213649  10/1973  Germany ............................. 410/97

OTHER PUBLICATIONS

Maurel's Specification 2 pages labeled No. 9087, Sep. 20, 1841, classified in 24/200

Primary Examiner—Michael S. Huppert
Assistant Examiner—Stephen Gordon
Attorney, Agent, or Firm—Novak, Druce, Herrmann, Burt

[57] ABSTRACT

A restraining device for the vehicular transportation of cargo comprised of weather resistant straps attached to each other to form a lattice webbing which when coupled with adjustable self locking buckles and flat hooks, can be utilized with most vehicles to restrain cargo of various sizes and shapes.

1 Claim, 2 Drawing Sheets

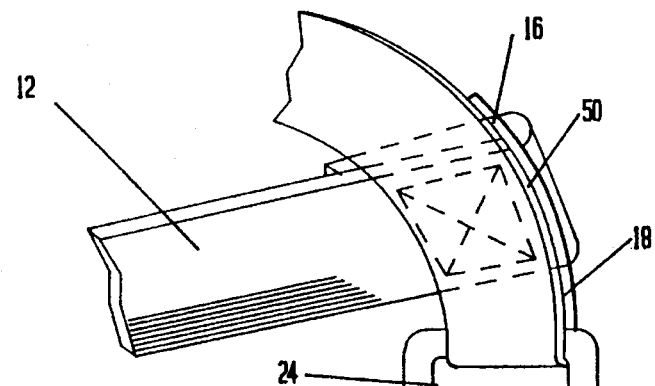
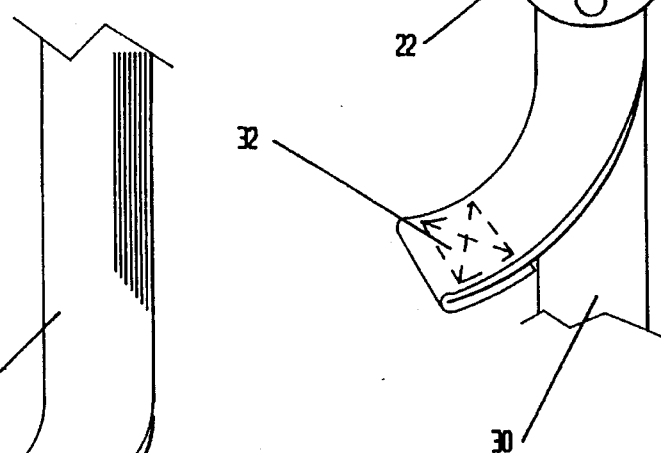
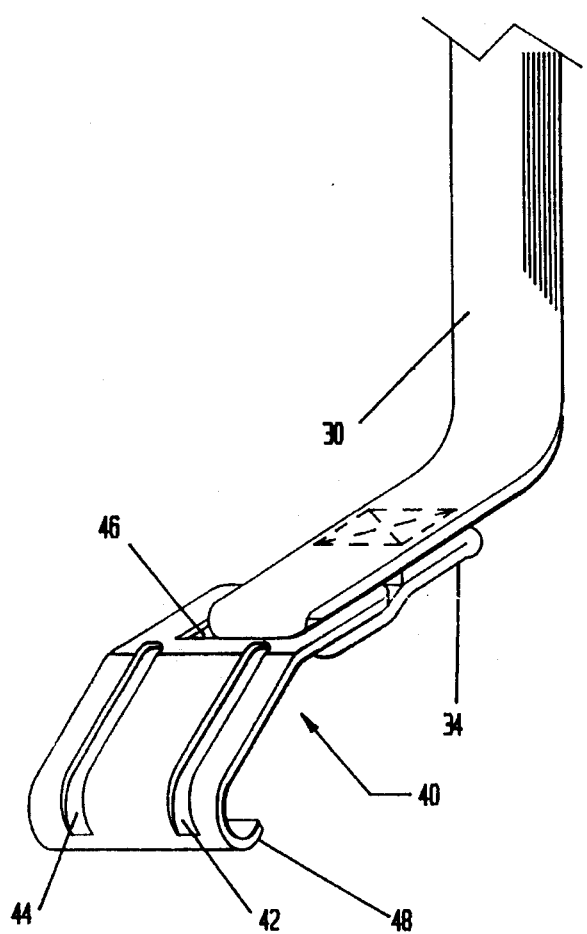

CARGO RESTRAINT

BACKGROUND OF THE INVENTION

1) Field of the Invention

The present invention relates generally to a cargo restraint, and more particularly to a restraining device for various sizes of cargo being transported by various vehicles.

2) Description of the Related Art

In our fast-paced, mobile society, the need for rapidly, but safely, transporting cargo has reached enormous proportions. Whether for commercial or personal purposes, individuals are constantly transporting cargo of various shapes and sizes from one place to another, local and interstate. Whether its the family on vacation, transporting their cargo on their car's luggage rack, or the local business transporting cargo in their pick up for a delivery. The individual doesn't want to invest a lot of time in restraining his cargo, however, he doesn't want to worry about the cargo falling out of their vehicle. The individual wants to be able to transport his cargo as easily and as quickly as possible while at the same time adhering to all Local, State and Federal transportation regulations.

Previous cargo restraining devices have failed to focus on the needs of the general public and have instead focused on the needs of the transportation industry. Some examples of these devices are described in U.S. Pat. No. 3,312,181 and U.S. Pat. No. 3,961,585. These patents describe restraining devices that are utilized in conjunction with a pallet for transportation on a industrial level. An additional device pertaining to restraining devices is described in U.S. Pat. No. 5,193,955. However, this patent is also directed toward the transportation industry and further demonstrates the need for a cargo restraining device directed toward the cargo transporting needs of the general public. What the general public needs is a device that is easily utilized in conjunction with most pick up trucks and which is resistant to destructive elements while properly restraining cargo.

SUMMARY OF THE INVENTION

The present invention is a cargo restraint for various shapes and sizes of cargo transported in motor vehicles, whether for commercial or personal purposes. The cargo restraint is a lattice webbing made of a material that is highly resistant to destructive elements such as sun, rain, heat, cold, dirt and automotive exhaust fumes. The material used in construction of the cargo restraint is capable of being dyed various colors in order to appeal to the consuming public. The lattice webbing is composed of straps stitched together in a lattice structure. All the strap ends are cut with a hot knife, searing the material, then the material is folded back, double layered and then stitched to ensure no exposed ends and a cargo restraint of the highest quality.

The lattice webbing has straps that extend beyond the lattice on both sides to form extending straps which allow for attachment of adjustable self locking buckles. The buckles are sewn permanently to the extending straps to ensure strength and reliability. The buckles are made from high strength poly carb plastics with a black mat finish and a thumb tab release feature and a minimum test strength of 250 pounds per square inch. The buckles will not loosen or slip under pressure. The buckles are structured to engage an anchoring strap on the end opposite the extending straps. The length of the anchoring strap is adjusted for each particular size and shape of cargo.

The invention also has specially designed flat hooks which allow for easy anchorage to pick-up beds, vehicle flat beds, wood or metal side rails, utility trailers. The flat hooks are rubber coated to prevent damage to the vehicle. These flat hooks are sewn permanently to the anchoring straps to prevent misplacing and ease of application and use. The invention can also be utilized without the flat hooks in order to restrain cargo on luggage racks and basket carriers. When the invention is used without flat hooks, the anchoring straps themselves are used for anchorage to the luggage rack or basket carrier.

It is an object of this invention to provide an improved cargo restraining device for utilization with motor vehicles.

It is a further object of this invention to provide a cargo restraint that is resistant to destructive elements such as sun, rain, heat, cold, dirt and automotive exhaust fumes.

It is a further object of this invention to provide a cargo restraint that is appealing to the consuming public.

It is a further object of this invention to provide a cargo restraint that has a tensile strength of up to one thousand pounds.

It is a further object of this invention to provide a cargo restraint that can be utilized in the transportation of various sizes and shapes of cargo.

Other objects will become apparent from the detailed description of the present invention.

BRIEF DESCRIPTION OF THE DRAWINGS

The present invention is further described in connection with the accompanying drawings, in which:

FIG. 2 is a perspective view showing an adjustable self-locking buckle attached to the lattice webbing member and engaged with an anchoring strap of the present invention; and FIG. 3 is a perspective view of a flat hook attached to an anchoring strap of the present invention.

DETAILED DESCRIPTION OF THE INVENTION

Figure 1:
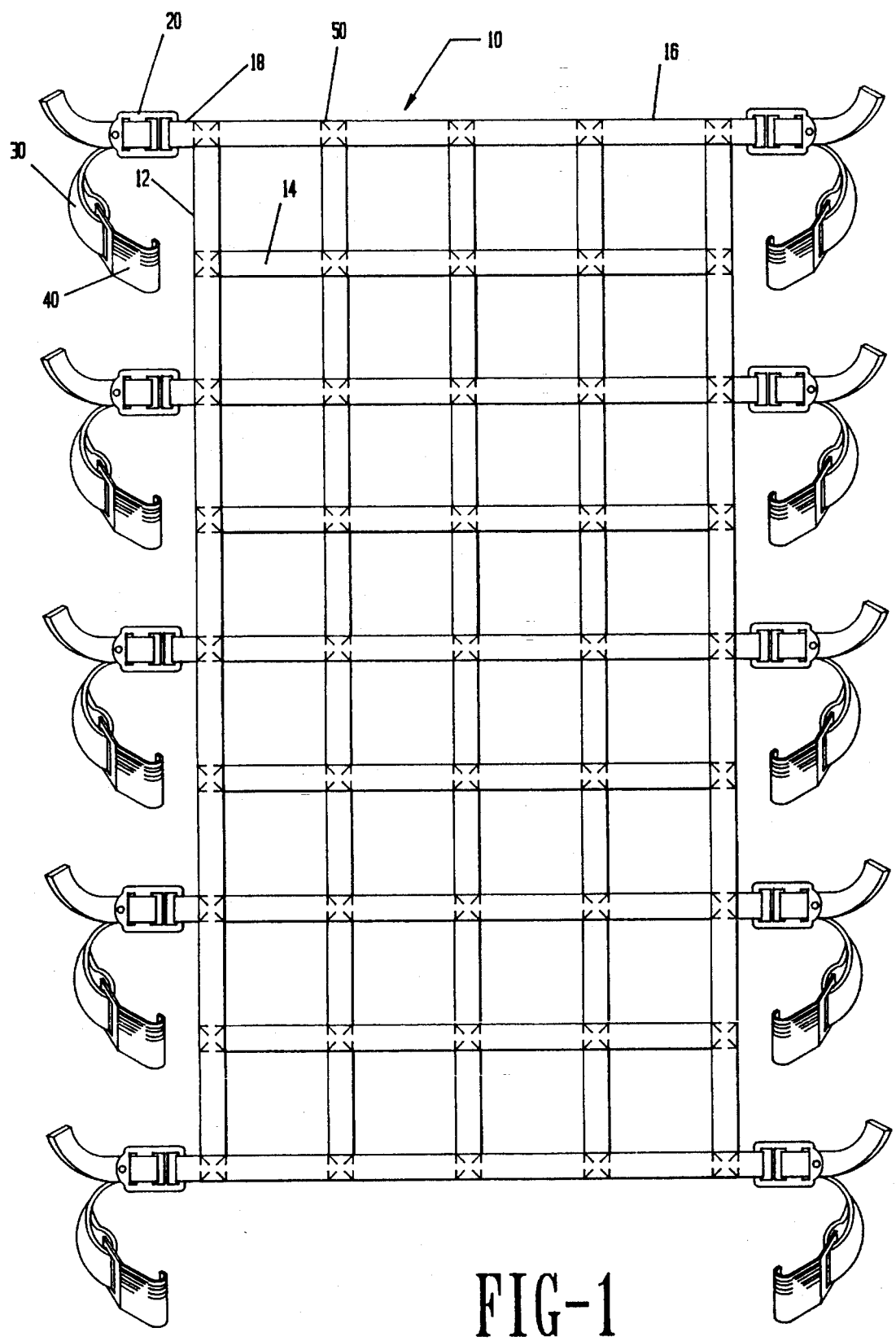
FIG. 1 is a plan view of the present invention.

FIG. 1 is a top plan view of the present invention. In FIG. 1 a lattice webbing member 10 is comprised of a plurality of longitudinal straps 12, a plurality of latitudinal straps 14 and a plurality of latitudinal straps 16 with latitudinally extending portions 18. The straps are made of a highly resistant material which limits the destructive effects of elements such as sun, rain, heat, cold, dirt and automotive exhaust fumes. In the preferred embodiment of the invention, the straps are made of nylon or polypropylene.

The plurality of longitudinal straps 12 are positioned parallel to each other, a set distance apart to ensure complete coverage of the cargo. The plurality of latitudinal straps 16 with latitudinally extending portions 18 are positioned perpendicular to and traversing the longitudinal straps 12 interdispersed with the plurality of latitudinal straps 14 thereby forming a lattice webbing member 10 where every other strap perpendicular to the plurality of longitudinal straps is a latitudinal strap 16 with latitudinally extending portions 18. In the preferred embodiment, the plurality of latitudinal strap 16 with latitudinally extending portions 18 are the first and last straps perpendicular to the plurality of longitudinal straps 12.

Where each of the plurality of longitudinal straps 12 traverse each of the plurality of latitudinal straps 14 or plurality of latitudinal straps 16 with extending portions 18, a plurality of traversal areas 50 are formed. These plurality of traversal areas 50 are where each of the plurality of longitudinal straps 12 are stitched to each of the plurality of latitudinal straps 14 or plurality of latitudinal straps 16 with extending portions 18. The plurality of traversal areas 50 are not only an area where the longitudinal and latitudinal straps are permanently attached, but also an area to distribute and absorb cargo pressure.

Attached to each of the latitudinally extending portions 18 are a plurality of adjustable self locking buckles 20. As shown in FIG. 2, each of the plurality of buckles 20 have a forward aperture 22, a rearward aperture 24 and a center aperture 26. Each of the latitudinally extending portions 18 are looped through the rearward aperture 24 of each of the plurality of buckles 20, and then each of the latitudinally extending portions 18 are folded back, double layered and stitched to itself for permanent attachment of each of the plurality of buckles 20 to each of the latitudinally extending portions 18.

A plurality of anchoring straps 30, each having a buckle end 32 and a hook end 34, are positioned in line with each of the plurality of buckles 20. The buckle end 32 of each of the anchoring straps 30 is first slipped through the center aperture 26 and then looped and slipped through the forward aperture 22 of each of the plurality of buckles 20. This allows the plurality of anchoring straps 30 to be adjusted to the different sizes and shapes of various cargo by pulling each of the plurality of anchoring straps 30 through each of the plurality of buckles 20 to shorten or extend each individual anchoring strap 30.

A plurality of flat hooks 40, each having a plurality of elongated slots 42 and 44, and an aperture 46, are attached to the hook end 34 of each of the plurality of anchoring straps 30. As shown in FIG. 3, the hook end 34 of each of the plurality of anchoring straps 30 is looped through the aperture 46 of each of the plurality of flat hooks 40, and then the hook end 34 is folded back, double layered and stitched to itself for permanent attachment of each of the plurality of flat hooks 40 to each of plurality of anchoring straps 30. Each of the plurality of flat hooks 40 has a curvature end 48, opposite the aperture 46, the curvature end 48 being a engagement mechanism for attachment of the lattice webbing member 10 with a vehicle. The curvature end 48 of each of the plurality of flat hooks 40 are designed to connect the lattice webbing member 10 to pick-up beds, vehicle flat beds, wood or metal side rails, utility trailers, luggage racks, basket carriers, and the like. In the preferred embodiment, the plurality of flat hooks 40 are rubber coated to prevent damage to a vehicle.

In operation, cargo is loaded onto a vehicle's pick-up bed, or the like. The lattice webbing member 10 is positioned over the cargo with the plurality of anchoring straps 30 off to the sides. The plurality of flat hooks 40 are positioned so as to have the curvature end 48 engage with overhang of the side of the vehicle's pick-up bed. The slack of each of the plurality of anchoring straps 30 is taken up by pulling the buckle end 32 of each of the plurality of anchoring straps 30 through the forward aperture of each of the plurality of buckles 20. This enables the lattice webbing member to be securely fastened to the vehicle and prevents the cargo from moving while in the vehicle.

While preferred embodiments of the invention have been shown and described, it will be apparent to those skilled in this art that various modification may be made in these embodiments without departing from the spirit of the present invention. Therefore, the embodiments of the invention in which an exclusive property or privilege is claimed are defined as follows:

What is claimed is:

1. A restraining device utilized in conjunction with a conventional pick up truck having side walls defining a rear open bed, the side walls having an overhang, the restraining device being attachable to the pick up truck in order to safely transport a load of cargo placed within the rear open bed of the pick up truck without substantial movement of the cargo, the restraining device comprising:

a lattice webbing member for encompassing the top of the cargo placed within the bed of the pick up truck thereby substantially preventing the movement of the load of cargo, said lattice webbing member being generally rectangular in shape and having a plurality of longitudinal straps, a plurality of latitudinal straps and a plurality of extended latitudinal straps longer than said latitudinal straps, said plurality of longitudinal straps arranged parallel to each other along a rectangular length of said lattice webbing member, a longitudinal boundary of said lattice member defined by a first and a last longitudinal strap of said plurality of longitudinal straps, each of said plurality of longitudinal straps having a predetermined length allowing for general conformance to the bed of conventional pick up trucks, said plurality of latitudinal straps and said plurality of extended latitudinal straps being arranged parallel to each other and perpendicular to said plurality of longitudinal straps, said plurality of latitudinal straps and said plurality of extended latitudinal straps being attached to said plurality of longitudinal straps at a plurality of traversal areas, a latitudinal boundary of said lattice member defined by a first and a last extended latitudinal strap of said plurality of extended latitudinal straps, each of said plurality of latitudinal straps having a predetermined length allowing for general conformance to the bed of conventional pick up trucks, said plurality of extended latitudinal straps extending just beyond said longitudinal boundary of said lattice member;

a plurality of adjustable self locking buckles, each of said plurality of adjustable self locking buckles having a forward aperture, a rearward aperture and a center aperture, each of said extended latitudinal straps corresponding to one of said plurality of adjustable self locking buckles wherein each of said latitudinal extending straps is looped through said rearward aperture of each corresponding one of said adjustable self locking buckles and then folded back, double layered and stitched to itself to secure each of said plurality of extended latitudinal straps to each corresponding one of said adjustable self locking buckles;

a plurality of anchoring straps, each of said plurality of anchoring straps having a buckle end and a hook end, each of said plurality of anchoring straps corresponding to one of said plurality of adjustable self locking buckles wherein said buckle end is first looped through said center aperture and then through said forward aperture of each corresponding one of said plurality of adjustable self locking buckles, said buckle end is then folded and attached to itself to maintain its integrity;

a plurality of flat hooks, each of said plurality of flat hooks having a curvature end, a pair of elongated slots and an aperture, said curvature end for easy attachment and detachment with the overhang of the side walls of the pick up truck, each of said plurality of anchoring straps corresponding to one of said plurality of flat hooks wherein said hook end of each of said plurality of anchoring straps is looped through said aperture of each corresponding one of said plurality of flat hooks and then folded and attached to itself thereby securing itself to each corresponding one of said plurality of flat hooks, each of said plurality of flat hooks being rubber coated to prevent damage to the side walls of the pick up truck; and, said plurality of longitudinal straps, said plurality of latitudinal straps, said plurality of extended straps and said plurality of anchoring straps are composed of a material selected from the group consisting of nylon and polypropylene;

whereby once a load of cargo is loaded in the open bed of the pick up truck, the restraining device may be placed on top of the load of cargo and each of said plurality of flat hooks may be engaged to the overhang of the side walls of the pick up truck thereby easily connecting the restraining device to the pick up truck, then each of said plurality of adjustable self locking buckles may be adjusted by tightening or loosening each corresponding one of said plurality of anchoring straps through said center aperture and forward aperture of each of said plurality of adjustable self locking buckles thereby allowing the restraining device to conform tightly on top of the load of cargo to prevent substantial movement of the cargo placed within the open bed of the pick up truck.

\* \* \* \* \*